United States Patent
Magar et al.

(10) Patent No.: US 11,434,541 B2
(45) Date of Patent: Sep. 6, 2022

(54) HIGH STRENGTH AND HIGH FORMABILITY STEEL SHEET AND MANUFACTURING METHOD

(71) Applicant: ArcelorMittal, Luxembourg (LU)

(72) Inventors: Coralie Magar, Schwerdorff (FR); Kangying Zhu, Metz (FR); Astrid Perlade, Le Ban Saint-Martin (FR)

(73) Assignee: ARCELORMITTAL, Luxembourg (LU)

( * ) Notice: Subject to any disclaimer, the term of this patent is extended or adjusted under 35 U.S.C. 154(b) by 130 days.

(21) Appl. No.: 16/332,619

(22) PCT Filed: Sep. 15, 2017

(86) PCT No.: PCT/EP2017/073337
§ 371 (c)(1),
(2) Date: Mar. 12, 2019

(87) PCT Pub. No.: WO2018/054787
PCT Pub. Date: Mar. 29, 2018

(65) Prior Publication Data
US 2021/0115528 A1    Apr. 22, 2021

(30) Foreign Application Priority Data
Sep. 22, 2016  (WO) ............... PCT/IB2016/001349

(51) Int. Cl.
| | | |
|---|---|---|
| *C21D 8/02* | (2006.01) | |
| *B23K 11/11* | (2006.01) | |
| *C21D 1/18* | (2006.01) | |
| *C21D 6/00* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C23C 2/06* | (2006.01) | |
| *C23C 2/12* | (2006.01) | |
| *C23C 2/40* | (2006.01) | |

(52) U.S. Cl.
CPC ............ *C21D 8/0236* (2013.01); *B23K 11/11* (2013.01); *C21D 1/18* (2013.01); *C21D 6/008* (2013.01); *C21D 8/0226* (2013.01); *C21D 8/0263* (2013.01); *C21D 8/0273* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C23C 2/06* (2013.01); *C23C 2/12* (2013.01); *C23C 2/40* (2013.01); *C21D 2211/001* (2013.01); *C21D 2211/008* (2013.01)

(58) Field of Classification Search
CPC ........ C21D 8/0236; C21D 1/18; C21D 6/008; C21D 8/0226; C21D 8/0263; C21D 8/0273; C21D 9/46; C21D 2211/001; C21D 2211/008; B23K 11/11; C22C 38/001; C22C 38/002; C22C 38/02; C22C 38/04; C22C 38/06; C23C 2/06; C23C 2/12; C23C 2/40
See application file for complete search history.

(56) References Cited

U.S. PATENT DOCUMENTS

| | | | |
|---|---|---|---|
| 5,380,378 A * | 1/1995 | Hemsath | .................. C21D 9/67 148/601 |
| 2013/0295402 A1* | 11/2013 | Oh | ........................ C22C 38/002 428/551 |
| 2014/0162088 A1 | 6/2014 | Kawata et al. | |
| 2014/0287263 A1 | 9/2014 | Kawata et al. | |
| 2014/0342183 A1 | 11/2014 | Wakabayashi et al. | |
| 2014/0377584 A1* | 12/2014 | Hasegawa | ............. C22C 38/001 428/659 |
| 2016/0333448 A1* | 11/2016 | Hayashi | .................. C21D 9/46 |
| 2018/0010207 A1 | 1/2018 | Fatamura et al. | |

FOREIGN PATENT DOCUMENTS

| | | | | |
|---|---|---|---|---|
| EP | 2660345 A2 | 11/2013 | | |
| ES | 2535420 T3 * | 5/2015 | ............... | C23C 2/02 |
| JP | 2016130358 A | 7/2016 | | |
| KR | 20160095037 A | 8/2016 | | |
| RU | 2557862 C1 | 7/2015 | | |
| RU | 2566695 C1 | 10/2015 | | |

(Continued)

*Primary Examiner* — Christopher S Kessler
*Assistant Examiner* — Andrew M Cheung
(74) *Attorney, Agent, or Firm* — Davidson, Davidson & Kappel, LLC

(57) ABSTRACT

A cold-rolled and heat-treated steel sheet, having a composition including, by weight percent: 0.10%≤C≤0.40%, 3.5%≤Mn≤8.0%, 0.5%≤Si≤2.5%, 0.003%≤Al≤3.0%, with Si+Al≥0.8%, 0.001%≤Mo≤0.5%, S≤0.010%, P≤0.020%, N≤0.008%, and optionally one or more elements selected from a group comprising Cr, Ti, Nb, V and B, such that: 0.01%≤Cr≤2.0%, 0.010%≤Ti≤0.080%, 0.010%≤Nb≤0.080%, 0.010%≤V≤0.30%, 0.0005%≤B≤0.003%, the remainder of the composition being iron and unavoidable impurities resulting from the smelting. The microstructure includes, in surface fraction, between 10% and 50% of retained austenite, at most 8% of fresh martensite, and tempered martensite. The retained austenite includes Mn-enriched austenite, having a Mn content higher than 1.3*Mn %, Mn % designating the Mn content of the steel sheet, a surface fraction of the Mn-enriched austenite with respect to the whole microstructure is between 2% and 12%, and Mn-poor austenite, having an Mn content between 0.5*Mn % and 1.3*Mn %.

19 Claims, No Drawings

(56) References Cited

FOREIGN PATENT DOCUMENTS

| RU | 2586386 C2 | 6/2016 |
|---|---|---|
| WO | 2012120020 A1 | 9/2012 |
| WO | 2016001703 A1 | 1/2016 |
| WO | 2016001887 A2 | 1/2016 |
| WO | WO2016001889 A2 | 1/2016 |
| WO | WO2016001887 A3 | 3/2016 |

\* cited by examiner

HIGH STRENGTH AND HIGH FORMABILITY STEEL SHEET AND MANUFACTURING METHOD

The present invention relates to a method for producing a high strength steel sheet having high ductility and formability and to a sheet obtained with this method.

BACKGROUND

To manufacture various equipments such as parts of body structural members and body panels for automotive vehicles, it is known to use sheets made of DP (Dual Phase) steels or TRIP (Transformation Induced Plasticity) steels.

To reduce the weight of the automotive in order to improve their fuel efficiency in view of the global environmental conservation, it is desirable to have sheets having improved yield and tensile strengths. But such sheets must also have a good ductility and a good formability and more specifically a good stretch flangeability.

In order to solve this problem, it is known to produce sheets by a so-called quenching and partitioning process, wherein the sheets are cooled from an annealing temperature, down to a quenching temperature below the Ms transformation point, and thereafter heated to a partitioning temperature and maintained at this temperature for a given time. The resulting steel sheets have a structure comprising martensite and retained austenite, and optionally bainite and/or ferrite.

SUMMARY OF THE INVENTION

However, it remains desirable to be able to produce a steel sheet or part having an improved combination of strength, ductility and formability.

Especially, it remains desirable to be able to produce a steel sheet having a yield strength YS comprised between 1100 MPa and 1700 MPa, a tensile strength TS comprised between 1300 MPa and 2000 MPa, a uniform elongation UE greater than or equal to 10%, a total elongation TE greater than or equal to 13%, a product yield strength×uniform elongation (YS×UE) of at least 13000 MPa %, a product tensile strength×total elongation (TS×TE) of at least 19000 MPa % and a hole expansion ratio HER of at least 20%.

The yield strength YS, the tensile strength TS, the uniform elongation UE and the total elongation TE are measured according to ISO standard ISO 6892-1, published in October 2009. It must be emphasized that, due to differences in the methods of measurement, in particular due to differences in the geometries of the specimen used, the values of the total elongation TE according to the ISO standard are significantly different, and are in particular lower, than the values of the total elongation measured according to the JIS Z 2241 standard, using a specimen according to the JIS Z 2201-05 standard. The hole expansion ratio HER is measured according to ISO standard 16630:2009. Due to differences in the methods of measure, the values of the hole expansion ratio HER according to the ISO standard 16630:2009 are very different and not comparable to the values of the hole expansion ratio A according to the JFS T 1001 (Japan Iron and Steel Federation standard).

For this purpose, the present invention provides a cold-rolled and heat-treated steel sheet, having a composition comprising, by weight percent:

0.10%≤C≤0.40%
3.5%≤Mn≤8.0%
0.5%≤Si≤2.5%
0.003%≤Al≤3.0%
with Si+Al≥0.8%
0.001%≤Mo≤0.5%
S≤0.010%
P≤0.020%
N≤0.008% and optionally one or more elements selected from amongst Cr, Ti, Nb, V and B, such that:

0.01%≤Cr≤2.0%
0.010%≤Ti≤0.080%
0.010%≤Nb≤0.080%
0.010%≤V≤0.30%
0.0005%≤B≤0.003%, the remainder of the composition being iron and unavoidable impurities resulting from the smelting, said cold-rolled steel sheet having a microstructure consisting of, in surface fraction, between 10% and 50% of retained austenite, at most 8% of fresh martensite, and tempered martensite, said retained austenite comprising:

Mn-enriched austenite, having a Mn content higher than 1.3*Mn %, Mn % designating the Mn content of the steel sheet, and Mn-poor austenite, having an Mn content comprised between 0.5*Mn % and 1.3*Mn %, the surface fraction of said Mn-enriched austenite with respect to the whole microstructure being comprised between 2% and 12%.

Preferably, the Mn-poor austenite and Mn-enriched austenite have an average C content comprised between 0.4% and 1.0%.

Preferably, the Mn-enriched austenite is in the shape of islands, the average size of the islands of Mn-enriched austenite being lower than 500 nm.

Preferably, said fresh and tempered martensite comprise carbides, the surface density of carbides whose largest dimension is higher than 60 nm being lower than or equal to $4 \times 10^6/mm^2$.

Preferably, the cold-rolled and heat-treated steel sheet has a yield strength YS comprised between 1100 MPa and 1700 MPa, a tensile strength TS comprised between 1300 MPa and 2000 MPa, a uniform elongation UE of at least 10%, a total elongation TE, measured according to ISO standard ISO 6892-1, of at least 13%, a product tensile strength×total elongation (TS×TE) of at least 19000 MPa %, a product yield strength×uniform elongation (YS×UE) of at least 13000 MPa %, and a hole expansion ratio HER, measured according to the ISO standard 16630:2009, of at least 20%.

According to an embodiment, the cold-rolled and heat-treated steel sheet is coated with Zn or a Zn alloy.

According to another embodiment, the cold-rolled and heat-treated steel sheet is coated with Al or a Al alloy.

According to an embodiment, the composition satisfies at least one of the following conditions:

C≥0.15%,
C≤0.30%.

Preferably, Mn 3.7%.

The invention also provides a method for manufacturing a cold-rolled and heat-treated steel sheet, comprising the following successive steps:

casting a steel so as to obtain a slab, said steel having a composition comprising, by weight percent:

0.10%≤C≤0.40%
3.5%≤Mn≤8.0%
0.5%≤Si≤2.5%
0.003%≤Al≤3.0%
with Si+Al≥0.8%
0.001%≤Mo≤0.5%

S≤0.010%
P≤0.020%
N≤0.008%
and optionally one or more elements selected from amongst Cr, Ti, Nb, V and B, such that:
0.01%≤Cr≤2.0%
0.010%≤Ti≤0.080%
0.010%≤Nb≤0.080%
0.010%≤V≤0.30%
0.0005%≤B≤0.003%,
the remainder of the composition being iron and unavoidable impurities resulting from the smelting,
reheating the slab at a temperature $T_{reheat}$ comprised between 1150° C. and 1300° C.,
hot rolling the reheated slab at a temperature higher than Ar3 to obtain a hot rolled steel,
coiling the hot rolled steel at a temperature comprised between 20° C. and 600° C.,
annealing the hot-rolled steel at a temperature $T_{HBA}$ lower than Ac1-20° C., for a time $t_{HBA}$ comprised higher than or equal to a minimal batch annealing time $t_{HBAmin}$, defined as:

$$t_{HBA\,min} = \exp\left[\frac{8.32}{T_{HBA}} \times 1000 - 12\right] \times \left(\frac{1000*C\,\%}{Mn\,\%^2}\right)$$

wherein $t_{HBAmin}$ is expressed in hours, $T_{HBA}$ is the batch annealing temperature, expressed in Kelvin, Mn % designates the Mn content of the steel, by weight percent, and C % designates the C content of the steel, by weight percent,
cold rolling the steel so as to obtain a cold rolled steel sheet,
reheating the cold-rolled steel sheet to an annealing temperature $T_A$ comprised between Ae3 and Ae3+150° C. so as to obtain, upon annealing, a structure consisting of austenite, and maintaining the cold-rolled steel sheet at the annealing temperature $T_A$ for a holding time $t_A$ comprised between $t_{Amin}$ and $t_{Amax}$,
$t_{Amin}$ and $t_{Amax}$ being defined as:

$$t_{A\,min} = \exp\left[\frac{68.4}{T_A} \times 1000 - 69.07\right] \times 3600 \times \left(\frac{Mn\,\%}{20 \times C\,\%} + Cr\,\%\right)$$

$$t_{A\,max} = \exp\left[\frac{27.03}{T_A} \times 1000 - 27.63\right] \times 3600 \times \left(\frac{Mn\,\%}{20 \times C\,\%} + Cr\,\%\right)$$

wherein $t_{Amin}$ and $t_{Amax}$ are expressed in seconds and $T_A$ is the annealing temperature expressed in Kelvin, Mn % designates the Mn content of the steel, expressed by weight percent, C % designates the C content of the steel, expressed by weight percent and Cr % designates the Cr content of the steel, expressed by weight percent.
quenching the cold-rolled steel sheet at a cooling rate high enough to avoid the formation of ferrite and pearlite upon cooling, to a quenching temperature QT comprised between Mf+20° C. and Ms−50° C.,
reheating the cold-rolled steel sheet to a partitioning temperature $T_P$ comprised between 350° C. and 500° C., and maintaining the cold-rolled steel sheet at said partitioning temperature $T_P$ for a partitioning time $t_P$ comprised between 3 s and 1000 s,
cooling the cold-rolled steel sheet to the room temperature, to obtain a cold-rolled and heat treated steel sheet.
Preferably, the batch annealing temperature $T_{HBA}$ is higher than or equal to 500° C.

After the cold-rolled steel sheet is quenched to the quenching temperature QT and before the sheet is heated to the partitioning temperature $T_P$, the sheet is preferably held at the quenching temperature QT for a holding time comprised between 2 s and 200 s, preferably between 3 s and 7 s.

According to an embodiment, between the maintaining of the cold-rolled steel sheet at the partitioning temperature $T_P$ and the cooling of the cold-rolled steel sheet to the room temperature, the steel sheet is hot-dip coated in a bath at a temperature lower than or equal to 480° C.

According to another embodiment, after the maintaining of the cold-rolled sheet at the partitioning temperature $T_P$, the cold-rolled sheet is immediately cooled to the room temperature.

After the step of cooling down the cold-rolled steel sheet to the room temperature, the cold-rolled and heat treated steel sheet may be coated by an electrochemical method or through a vacuum coating process.

According to an embodiment, the cold-rolled and heat treated steel sheet is coated with Zn or a Zn alloy.

According to another embodiment, the cold-rolled and heat-treated steel sheet is coated with Al or a Al alloy.

Preferably, the cold-rolled and heat treated steel sheet has a microstructure consisting of, in surface fraction, between 10% and 50% of retained austenite, at most 8% of fresh martensite, and tempered martensite, said retained austenite comprising:
Mn-enriched austenite, having a Mn content higher than 1.3*Mn %, Mn % designating the Mn content of the steel sheet, and
Mn-poor austenite, having an Mn content comprised between 0.5*Mn % and 1.3*Mn %, the surface fraction of said Mn-enriched austenite with respect to the whole microstructure being comprised between 2% and 12%.

According to an embodiment, wherein the composition satisfies at least one of the following conditions:
C≥0.15%,
C≤0.30%.
Preferably, Mn 3.7%.

The invention further provides a resistance spot welded joint of at least two steel sheets, wherein at least one of said two steel sheets is a cold-rolled and heat-treated steel sheet according to the invention.

Preferably, the resistance spot welded joint has an alpha value before any post welding heat treatment of at least 30 daN/mm².

Preferably, the resistance spot welded joint has an alpha value of at least 50 daN/mm².

Preferably, the two steel sheets are cold-rolled and heat-treated steel sheets according to the invention, and have a composition such that $$C_{eq} = C\,\% + \frac{Mn\,\%}{6} + \frac{Si\,\%}{6} + \frac{(Cr\,\% + Mo\,\% + V\,\%)}{5} \leq 1.30\%.$$

The invention also provides a process for producing a resistance spot welded joint of at least two steel sheets, comprising the steps of:
providing a cold-rolled and heat-treated steel sheet according to the invention or produced by a method according to the invention,
providing a second steel sheet,
resistance spot welding the cold-rolled and heat-treated steel sheet to the second steel sheet.

Preferably, the second steel sheet is a cold-rolled and heat-treated steel sheet according to the invention or produced by a method according to the invention.

DETAILED DESCRIPTION

The invention will now be described in details and illustrated by examples without introducing limitations.

Hereinafter, Ac1 designates the temperature at which austenite begins to form upon heating, Ae3 designates the equilibrium transformation temperature, above which austenite is completely stable, Ar3 designates the temperature at which the transformation of austenite to ferrite begins upon cooling, Ms designates the martensite start temperature, i.e. temperature at which the austenite begins to transform into martensite upon cooling, and Mf designates the martensite finish temperature, i.e. the temperature at the transformation from austenite to martensite finishes upon cooling. For a given steel, one skilled in the art knows how to determine these temperatures through dilatometry tests.

The composition of the steel according to the invention comprises, by weight percent:

0.10%≤C≤0.40% for ensuring a satisfactory strength and improving the stability of the retained austenite which is necessary to obtain a sufficient elongation. Preferably, the carbon content is higher than or equal to 0.10%, still preferably higher than or equal to 0.15%. Preferably, the carbon content is lower than or equal to 0.30%. If the carbon content is too high, the hot rolled sheet is too hard to cold roll and the weldability is insufficient. If the carbon content is below 0.10%, the tensile strength will not reach the targeted values. Still preferably, the carbon content is lower than or equal to 0.20%.

3.5%≤Mn≤8.0% for ensuring a satisfactory strength and achieving stabilization of at least part of the austenite, to obtain a sufficient elongation. Especially, the minimum is defined to obtain a final structure comprising, in surface fraction, between 2% and 12% Mn-enriched austenite, having a Mn content higher than 1.3*Mn %, Mn % designating the Mn content of the steel. The maximum is defined to avoid having segregation issues which are detrimental for the ductility. Preferably, the manganese content is higher than or equal to 3.7%. According to a first embodiment, the manganese content is comprised between 3.5% and 6.0%, preferably between 3.7% and 6.0%. According to a second embodiment, the manganese content is comprised between 6.0% and 8.0%. According to another embodiment, the manganese content is comprised between 3.5% and 4.0%.

0.5%≤Si≤2.5% and 0.003%≤Al≤3.0% of aluminum, the silicon and aluminum contents further satisfying the following relationship: Si+Al≥0.8%.

According to the invention Si and Al together play an important role: silicon delays the precipitation of cementite upon cooling below the equilibrium transformation temperature Ae3. Therefore, a Si addition helps to stabilize a sufficient amount of residual austenite. Si further provides solid solution strengthening and retards the formation of carbides during carbon redistribution from martensite to austenite resulting from an immediate reheating and holding step performed after a partial martensitic transformation. At a too high content, silicon oxides form at the surface, which impairs the coatability of the steel. Therefore, the Si content is less than or equal to 2.5%.

Aluminum is a very effective element for deoxidizing the steel in the liquid phase during elaboration. The Al content is not less than 0.003% in order to obtain a sufficient deoxidization of the steel in the liquid state. Furthermore, like Si, Al stabilizes the residual austenite. The Al content is not higher than 3.0% in order to avoid the occurrence of inclusions, to avoid oxidation problems and to ensure the hardenability of the material.

The effects of Si and Al on the stabilization of the austenite are similar. When the Si and Al contents are such that Si+Al≥0.8%, satisfactory stabilization of the austenite is obtained, thereby making it possible to form the desired microstructures.

0.001%≤Mo≤0.5%. A molybdenum content of 0.001% corresponds to the presence of Mo as an impurity. Preferably, the steel comprises a voluntary addition of Mo to increase the hardenability, to stabilize the retained austenite in order to reduce austenite decomposition during partitioning, and to reduce the central segregation which can result from the high manganese content and which is detrimental to the hole expansion ratio. When Mo is added, the Mo content is higher than or equal to 0.05%. Hence, the Mo content is preferably comprised between 0.05% and 0.5%. Above 0.5%, Mo may form too much carbides which may be detrimental for the ductility.

Optionally 0.01%≤Cr≤2.0% to delay the dissolution of carbides and stabilize the retained austenite. A maximum of 2.0% of chromium is allowed, above a saturation effect is noted, and adding Cr is both useless and expensive.

Optionally 0.010%≤Nb≤0.080%, in order to refine the austenite grains during hot-rolling and to provide precipitation strengthening. A niobium content of 0.010% to 0.080% makes it possible to obtain satisfactory yield strength and elongation.

Optionally 0.010%≤Ti≤0.080%. Especially, titanium may be added in a content between 0.010% and 0.080% in addition to boron to protect boron against the formation of BN.

Moreover, the addition of Nb and Ti can increase the resistance to the softening of martensite during tempering.

The Nb and Ti contents are each not higher than 0.080% in order to limit the hardening of the steel at high temperatures provided by these elements, which would make it difficult to produce thin plates due to increase of hot rolling forces.

Optionally, 0.010%≤V≤0.30% in order to provide precipitation strengthening. If the vanadium content is above 0.30%, vanadium will consume the carbon by forming carbides and/or carbo-nitrides and this will soften the martensite. In addition, the ductility of the steel according to the invention will be impaired.

Optionally 0.0005%≤B≤0.003%, in order to increase the quenchability of the steel.

The remainder of the composition of the steel is iron and impurities resulting from the smelting. In this respect, Ni, Cu, S, P and N at least are considered as residual elements which are unavoidable impurities. Therefore, their contents are less than 0.05% for Ni, 0.03% for Cu, 0.010% for S, 0.020% for P and 0.008% for N.

In addition, the composition is such that the carbon equivalent of the steel, defined as:

$$C_{eq} = C\% + \frac{Mn\%}{6} + \frac{Si\%}{6} + \frac{(Cr\% + Mo\% + V\%)}{5},$$

wherein C %, Mn %, Si %, Cr %, Mo %, and V %, designate the contents in C, Mn, Si, Cr, Mo and V in the steel respectively, is lower than or equal to 1.30%.

Indeed, with such a carbon equivalent, the weldability of the steel is highly improved. Moreover, the inventors have found that the steel sheet according to the invention or obtained through the process of the invention achieves a combination of very high mechanical properties without adding high amounts of alloying elements, that would impair weldability. Therefore, with a steel composition such that the carbon equivalent is lower than or equal to 1.30%, high ductility and strength can be obtained whilst retaining a good weldability.

Hot rolled sheet having a thickness between 2 and 6 mm can be produced by casting a steel having a composition as mentioned above so as to obtain a slab, reheating the slab at a temperature $T_{reheat}$ comprised between 1150° C. and 1300° C., and hot rolling the reheated slab, the final rolling temperature being higher than Ar3, to obtain a hot rolled steel.

The final rolling temperature is preferably of at most 1000° C., in order to avoid coarsening of the austenitic grains.

The hot-rolled steel is then cooled, at a cooling rate for example comprised between 1 and 50° C./s, and coiled at a temperature comprised between 20° C. and 600° C.

After the coiling, the sheet has a structure which may comprise bainite, martensite, austenite and optionally ferrite.

After the coiling, the sheet is pickled.

The sheet is then batch annealed, in order to form coarse carbides enriched in Mn.

Especially, the batch annealing temperature $T_{HBA}$ and the batch annealing time $t_{HBA}$ are controlled so as to obtain a precipitated carbon in cementite of at least 50% and up to 100% (these percentages being expressed with respect to the whole carbon content of the steel, i.e. at least 50% of the carbon of the steel is precipitated in cementite), and a Mn content in the cementite of at least 25%. A precipitated carbon in cementite of at least 50% implies that the percentage of carbon in solid solution, with respect to the whole carbon, is lower than 50%. The austenite fraction at the end of the batch annealing remains in any case lower than 5%.

The batch annealing temperature $T_{HBA}$ is lower than Ac1-20° C., in order to avoid the formation of austenite during the batch annealing, and therefore to limit the fraction of austenite in the sheet, after batch annealing, to at most 5%. The batch annealing temperature $T_{HBA}$ is preferably higher than or equal to 500° C., so as to obtain sufficient coarsening of the carbides.

Furthermore, the batch annealing time $t_{HBA}$, i.e. the holding time at the batch annealing temperature, must be higher than or equal to a minimal batch annealing time $t_{HBAmin}$, so as to obtain a precipitated carbon in cementite of at least 50% and a Mn content in the cementite of at least 25%.

The minimal batch annealing time $t_{HBAmin}$ depends on the batch annealing temperature $T_{HBA}$ and on the C and Mn contents of the steel. Especially, the higher the batch annealing temperature $T_{HBA}$, the lower the minimal batch annealing time $t_{HBAmin}$ required to obtain the targeted precipitated carbon in cementite and Mn content in the cementite. Furthermore, the higher the Mn content of the steel, and the lower the C content of the steel, the lower the minimal batch annealing time $t_{HBAmin}$ required to obtain the targeted precipitated carbon in cementite and Mn content in the cementite.

The inventors have found that the minimal batch annealing time $t_{HBAmin}$ is expressed as:

$$t_{HBAmin} = \exp\left[\frac{8.32}{T_{HBA}} \times 1000 - 12\right] \times \left(\frac{1000 * C\%}{Mn\%^2}\right)$$

wherein $t_{HBAmin}$ is expressed in hours (h), $T_{HBA}$ is the batch annealing temperature, expressed in Kelvin (K), Mn % designating the Mn content of the steel, expressed by weight percent, and C % designates the C content of the steel, expressed by weight percent.

If the batch annealing time is lower than the minimal batch annealing time $t_{HBAmin}$, insufficient precipitated carbon in cementite and Mn enrichment of the carbides are obtained.

At the end of the batch annealing, the steel has a structure consisting of coarse Mn-enriched carbides, at most 5% of austenite, and ferrite.

The sheet is then optionally pickled, and cold rolled to obtain a cold rolled sheet having a thickness between 0.7 mm and 3 mm, for example in the range of 0.8 mm to 2 mm.

The cold-rolling reduction ratio is preferably comprised between 20% and 80%.

The cold-rolled steel sheet is then heat treated on a continuous annealing line.

The heat treatment comprises the steps of:
reheating the cold-rolled steel sheet to an annealing temperature $T_A$ comprised between Ae3 and Ae3+150° C. so as to obtain, upon annealing, a structure consisting of austenite, and maintaining the cold-rolled steel sheet at the annealing temperature $T_A$ for a holding time $t_A$.

One skilled in the art knows how to determine Ae3 from dilatometry tests.

The annealing temperature $T_A$ is of at most Ae3+150° C., in order to limit the coarsening of the austenitic grains.

The reheating rate Vr to the annealing temperature $T_A$ is preferably comprised between 1° C./s and 200° C./s.

During the annealing, the coarse carbides, enriched in Mn, are dissolved, and the austenite is locally enriched in Mn. The holding time $t_A$ at the annealing temperature $T_A$ is selected so as to obtain the dissolution of the coarse cementite, thereby achieving local enrichment in Mn of the austenite, whilst avoiding diffusion of Mn in the whole structure.

Especially, the holding time $t_A$ at the annealing temperature $T_A$ is selected so as to obtain, at the end of the annealing step, from 2% to 12% of Mn-enriched austenite, with respect to the whole structure, the Mn-enriched austenite having a Mn content higher than 1.3*Mn %, Mn % designating the Mn content of the steel.

The inventors have discovered in order to obtain, at the end of the annealing step, from 2% to 12% of Mn-enriched austenite, the cold-rolled steel sheet must be maintained at the annealing temperature $T_A$ for a holding time $t_A$ comprised between a minimal holding time $t_{Amin}$ and a maximal holding time $t_{Amax}$, which depend on the annealing temperature $T_A$, and on the carbon, manganese and chromium contents of the steel, and are defined as:

$$t_{Amin} = \exp\left[\frac{68.4}{T_A} \times 1000 - 69.07\right] \times 3600 \times \left(\frac{Mn\%}{20 \times C\%} + Cr\%\right)$$

-continued $$t_{A\,max} = \exp\left[\frac{27.03}{T_A} \times 1000 - 27.63\right] \times 3600 \times \left(\frac{Mn\ \%}{20 \times C\ \%} + Cr\ \%\right)$$

wherein $t_{Amin}$ and $t_{Amax}$ are expressed in seconds (s) and $T_A$ is the annealing temperature, expressed in Kelvin (K). Mn % designates the Mn content of the steel, expressed by weight percent, C % designates the C content of the steel, expressed by weight percent and Cr % designates the Cr content of the steel, expressed by weight percent.

Especially, the inventors have found that the higher the ratio between the Mn content and the C content, and the higher the chromium content, the slower the carbides dissolution kinetics during annealing at the annealing temperature $T_A$. Hence, the minimal and maximal holding times are increasing functions of the ratio between Mn % and C % and increasing functions of the Cr content.

If the holding time is lower than the minimal holding time $t_{Amin}$, the dissolution of the coarse Mn-enriched carbides is insufficient, so that at the end of the annealing, the steel comprises carbides and the enrichment in Mn of the austenite is insufficient.

If the holding time is higher than the maximal holding time $t_{Amax}$, the coarse Mn-enriched carbides are completely dissolved, but the diffusion of Mn in the whole structure is too important, so that at the end of the annealing, the enrichment in Mn of the austenite is insufficient.

At the end of the annealing, the structure of the steel sheet consists of austenite, the austenite comprising Mn-enriched austenite, having a Mn content higher than 1.3*Mn %, and Mn-poor austenite, having an Mn content comprised between 0.5*Mn % and 1.3*Mn %. The proportion of Mn-enriched austenite, with respect to the whole structure, is comprised between 2% and 12%.

quenching the cold-rolled steel sheet at a cooling rate Vc high enough to avoid the formation of ferrite and pearlite upon cooling, to a quenching temperature QT lower than the Ms transformation point of the austenite. The quenching temperature QT is comprised between Mf+20° C. and Ms−50° C. The cooling rate Vc is preferably at least 2° C./s. For each particular composition of the steel and each structure, one skilled in the art knows how to determine the Ms and Mf start and finish transformation points of the austenite by dilatometry.

During this quenching step, the Mn-poor austenite partly transforms into martensite, whilst the Mn-enriched austenite, stabilized by Mn, is not transformed.

The quenching temperature QT is selected so as to obtain, just after quenching, a structure consisting of between 10% and 58% of austenite and at most 90% of martensite. The proportion of Mn-enriched austenite remains comprised between 2% and 12%.

One skilled in the art knows how to determine the quenching temperature adapted to obtain a desired structure.

If the quenching temperature QT is lower than Mf+20° C., the fraction of tempered (i.e. partitioned) martensite in the final structure is too high to stabilize a sufficient amount of retained austenite above 10%. Moreover, if the quenching temperature QT is higher than Ms−50° C., the fraction of tempered martensite in the final structure is too low to obtain the desired tensile strength.

optionally holding the quenched sheet at the quenching temperature QT for a holding time $t_Q$ comprised between 2 s and 200 s, preferably between 3 s and 7 s, so as to avoid the formation of epsilon carbides in martensite, that would result in a decrease in the elongation of the steel.

reheating the cold-rolled steel sheet to a partitioning temperature $T_P$ comprised between 350° C. and 500° C., and maintaining the cold-rolled steel sheet at the partitioning temperature $T_P$ for a partitioning time $t_P$ comprised between 3 s and 1000 s. During this partitioning step, the carbon diffuses from the martensite to the austenite, thereby achieving an enrichment in C of the austenite. Especially, the carbon diffuses from the martensite to the Mn-poor austenite and to the Mn-enriched austenite, so that both the Mn-poor austenite and Mn-enriched austenite are enriched with C.

If the partitioning temperature $T_P$ is higher than 500° C. or lower than 350° C., the elongation of the final product is not satisfactory.

optionally hot-dip coating the sheet in a bath at a temperature lower than or equal to 480° C. Any kind of coatings can be used and in particular, zinc or zinc alloys, like zinc-nickel, zinc-magnesium or zinc-magnesium-aluminum alloys, aluminum or aluminum alloys, for example aluminum-silicon.

immediately after the partitioning step, or after the hot-dip coating step, if performed, cooling the cold-rolled steel sheet to the room temperature, to obtain a cold-rolled and heat treated steel sheet. The cooling speed is preferably higher than 1° C./s, for example comprised between 2° C./s and 20° C./s.

During this cooling step, part of the Mn-poor austenite may transform into fresh martensite. However, the surface fraction of the fresh martensite remains lower than or equal to 8%, owing to the stabilization of austenite with C and/or Mn.

optionally, after cooling down to the room temperature, if the hot-dip coating step has not been performed, the sheet can be coated by electrochemical methods, for example electro-galvanizing, or through any vacuum coating process, like PVD or Jet Vapor Deposition. Any kind of coatings can be used and in particular, zinc or zinc alloys, like zinc-nickel, zinc-magnesium or zinc-magnesium-aluminum alloys. Optionally, after coating by electro-galvanizing, the sheet may be subjected to degassing.

optionally, after cooling down to the room temperature and optional coating, the sheet may be subjected to an additional tempering treatment, at a temperature comprised between 150° C. and 450° C., for a holding time comprised between 1 and 20 minutes (the higher the temperature, the lower the holding time). This tempering treatment is destined to improve the formability of the sheet.

This manufacturing method allows obtaining a final structure i.e. after partitioning and cooling to the room temperature, consisting of, in surface fraction:

between 10% and 50% of retained austenite,
at most 8% of fresh martensite, and
tempered martensite.

The retained austenite comprises:

Mn-enriched austenite, having a Mn content higher than 1.3*Mn %, the surface fraction of said Mn-enriched austenite with respect to the whole microstructure being comprised between 2% and 12%, and Mn-poor austenite, having an Mn content comprised between 0.5*Mn % and 1.3*Mn %. The surface fraction of the Mn-poor austenite is preferably of at least 5%.

The Mn-enriched austenite and the Mn-poor austenite are both enriched in C. The C content in the Mn-enriched and Mn-poor austenite is comprised between 0.4% and 1.0%.

The Mn-enriched austenite is in the shape of islands, the average size of the islands of Mn-enriched austenite being lower than 500 nm.

A surface fraction of at least 2% of Mn-enriched austenite, having a Mn content higher than 1.3*Mn %, allows obtaining an improved combination of elongation and strength.

Indeed, the enrichment of the retained austenite with Mn provides a high stabilization of the austenite, so that when the steel sheet is subjected to a deformation, the Mn-enriched austenite deforms by both glide of individual dislocations and mechanical twinning.

The martensite, including tempered martensite and fresh martensite, if any, comprises a small amount of carbides. Especially, the surface density of carbides in the martensite whose largest dimension is higher than 60 nm is lower than or equal to $4 \times 10^6/mm^2$. This small amount of carbides in martensite contributes to obtaining a product tensile strength×total elongation (TS×TE) of at least 19000 MPa %. Indeed, the smaller the amount of carbides, the lower the fraction of carbon and manganese under the form of carbides, and the higher the fraction of carbon and manganese in austenite. By contrast, a surface density of carbides in the martensite whose largest dimension is higher than 60 nm higher than $4 \times 10^6/mm^2$ would imply that the austenite does not contain sufficient amounts of carbon and manganese and is not sufficiently stabilized.

The fraction of fresh martensite in the structure is lower than or equal to 8%. Indeed, a fraction of fresh martensite higher than 8% would lead to a hole expansion ratio HER according to ISO 16630:2009 lower than 20%.

These features are for example determined by observing the microstructure with a Scanning Electron Microscope with a Field Emission Gun ("FEG-SEM") at a magnification greater than 5000×, coupled to an Electron Backscatter Diffraction ("EBSD") device and to a Transmission Electron Microscopy (TEM).

Steel sheets having a yield strength YS comprised between 1100 MPa and 1700 MPa, a tensile strength TS comprised between 1300 MPa and 2000 MPa, a uniform elongation UE of at least 10%, a total elongation TE measured according to ISO standard ISO 6892-1, of at least 13%, a product tensile strength×total elongation (TS×TE) of at least 19000 MPa %, a product yield strength×uniform elongation (YS×UE) of at least 13000 MPa % and a hole expansion ratio HER, measured according to the ISO standard 16630:2009, of at least 20% are obtained.

EXAMPLES

As examples and comparison, sheets made of steels compositions according to table 1, have been manufactured, the contents being expressed by weight percent.

TABLE I

| Steel | C (%) | Mn (%) | Si (%) | Al (%) | Si + Al (%) | Mo (%) | P (%) | N (%) | Cr (%) | Ti (%) | Nb (%) | V (%) | B (ppm) | Ceq (%) |
|---|---|---|---|---|---|---|---|---|---|---|---|---|---|---|
| I1 | 0.205 | 4.0 | 1.5 | 0.034 | 1.534 | 0.001 | 0.011 | 0.003 | res. | res. | res. | res. | res. | 1.12 |
| I2 | 0.204 | 3.95 | 1.47 | 0.032 | 1.502 | 0.002 | 0.01 | 0.002 | 0.96 | res. | res. | res. | res. | 1.30 |
| R1 | 0.163 | 2.7 | 2.0 | 0.03 | 2.03 | 0.001 | 0.01 | 0.004 | res. | res. | res. | res. | res. | 0.95 |
| R2 | 0.2 | 2.05 | 1.5 | 0.03 | 1.53 | 0.001 | 0.01 | 0.004 | res. | res. | res. | res. | res. | 0.79 |
| R3 | 0.2 | 2 | 1.58 | 0.03 | 1.61 | 0.288 | 0.01 | 0.004 | res. | res. | res. | res. | res. | 0.85 |
| R4 | 0.2 | 5 | 1.6 | 0.03 | 1.63 | 0.3 | res. | res. | res. | res. | res. | res. | res. | 1.36 |
| R5 | 0.2 | 5 | 1.6 | 0.03 | 1.63 | res. | res. | res. | res. | res. | res. | res. | res. | 1.30 |

In this Table, "res." means that the element is only present as a residual, and that no voluntary addition of this element was made.

The transformation temperatures of the steels such as Ac1, Ae3 (or Ac3) and Ms were measured by dilatometry, and are reported in Table II.

TABLE II

| Steel | Ac1 (° C.) | Ae3 (° C.) | Ms (° C.) |
|---|---|---|---|
| I1 | 730 | 770 | 315 |
| I2 | 735 | 780 | 305 |
| R1 | 770 | 840 | 368 |
| R2 | 760 | 830 | 355 |
| R3 | 765 | 840 | 350 |
| R4 | 557 | 752* | 282 |
| R5 | 562 | 742* | 284 |

*: the value provided is the temperature Ac3.

The steels were cast so as to obtain ingots. The ingots were reheated at a temperature $T_{reheat}$ of 1250° C., hot-rolled at a temperature higher than Ar3 to obtain a hot rolled steel, and pickled.

The hot-rolled steels were then coiled at a temperature $T_{coil}$, batch annealed at a temperature $T_{HBA}$ for a time $t_{HBA}$, pickled and cold-rolled with a cold-rolling reduction ratio of 50%, to obtain cold-rolled sheets having a thickness of 1.2 mm.

The cold-rolled sheets were reheated to an annealing temperature $T_A$ at a heating rate Vr=20° C./s and maintained at the annealing temperature $T_A$ for a holding time $t_A$, quenched at a cooling rate Vc to a quenching temperature QT and maintained at the temperature QT for a time $t_Q$.

The sheets were then reheated to a partitioning temperature $T_P$ and maintained at the partitioning temperature $T_P$ for a partitioning time $t_P$, then immediately cooled to the room temperature.

The conditions of treatment are reported in Table III.

TABLE III

| Ex. | Steel | Tcoil (° C.) | $T_{HBA}$ (° C.) | $t_{HBAmin}$ (h) | $t_{HBA}$ (h) | $T_A$ (° C.) | $t_{Amin}$ (s) | $t_{Amax}$ (s) | $t_A$ (s) | Vc (° C./s) | QT (° C.) | $t_Q$ (s) | $T_P$ (° C.) | $t_P$ (s) |
|---|---|---|---|---|---|---|---|---|---|---|---|---|---|---|
| 1 | I1 | 30 | 600 | 1.1 | 5 | 830 | 3 | 154 | 3 | 5 | 170 | 4 | 450 | 120 |
| 2 | I1 | 30 | 600 | 1.1 | 5 | 830 | 3 | 154 | 10 | 5 | 170 | 4 | 450 | 120 |
| 3 | I1 | 30 | 600 | 1.1 | 5 | 830 | 3 | 154 | 30 | 5 | 140 | 4 | 450 | 120 |
| 4 | I1 | 30 | 600 | 1.1 | 5 | 830 | 3 | 154 | 30 | 5 | 170 | 4 | 450 | 120 |
| 5 | I1 | 30 | 600 | 1.1 | 5 | 830 | 3 | 154 | 60 | 5 | 170 | 4 | 450 | 120 |
| 6 | I1 | 30 | 600 | 1.1 | 5 | 810 | 9.4 | 242 | 80 | 5 | 170 | 4 | 450 | 120 |
| 7 | I1 | 30 | 600 | 1.1 | 5 | 790 | 30.9 | 387 | 90 | 5 | 170 | 4 | 450 | 120 |
| <u>8</u> | I1 | 30 | 550 | 1.9 | 2 | 850 | 1 | 100 | <u>240</u> | 5 | 190 | 4 | 450 | 300 |
| <u>9</u> | I1 | 30 | 550 | 1.9 | 2 | 850 | 1 | 100 | <u>240</u> | 5 | 210 | 4 | 450 | 300 |
| <u>10</u> | I1 | 30 | 550 | 1.9 | 2 | 850 | 1 | 100 | <u>240</u> | 5 | 230 | 4 | 450 | 300 |
| 11 | I2 | 30 | 600 | 1.1 | 5 | 830 | 5.9 | 304 | 30 | 5 | 170 | 4 | 450 | 120 |
| 12 | I2 | 30 | 600 | 1.1 | 5 | 830 | 5.9 | 304 | 90 | 5 | 170 | 4 | 450 | 120 |
| 13 | I2 | 30 | 600 | 1.1 | 5 | 830 | 5.9 | 304 | 200 | 5 | 170 | 4 | 450 | 120 |
| 14 | I2 | 30 | 600 | 1.1 | 5 | 810 | 18.6 | 478 | 80 | 5 | 170 | 4 | 450 | 120 |
| 15 | I2 | 30 | 600 | 1.1 | 5 | 790 | 61.1 | 765 | 140 | 5 | 150 | 4 | 400 | 300 |
| <u>16</u> | I2 | 30 | 550 | 2 | 2 | 850 | 2 | 197 | <u>240</u> | 5 | 210 | 4 | 450 | 300 |
| <u>17</u> | I2 | 30 | 550 | 2 | 2 | 850 | 2 | 197 | <u>240</u> | 5 | 230 | 4 | 450 | 300 |
| <u>18</u> | R1 | 600 | 650 | 1.1 | 10 | 880 | 0.2 | 45 | <u>80</u> | 50 | 250 | 2 | 460 | 150 |
| <u>19</u> | R1 | 600 | 650 | 1.1 | 10 | 880 | 0.2 | 45 | <u>80</u> | 50 | 300 | 2 | 400 | 150 |
| <u>20</u> | R1 | 600 | 650 | 1.1 | 10 | 880 | 0.2 | 45 | <u>80</u> | 50 | 300 | 2 | 400 | 200 |
| <u>21</u> | R2 | 600 | 600 | 4 | <u>2</u> | 880 | 0.1 | 28 | <u>103</u> | 50 | 280 | 2 | 460 | 30 |
| <u>22</u> | R2 | 600 | 600 | 4 | <u>2</u> | 880 | 0.1 | 28 | <u>103</u> | 50 | 300 | 2 | 460 | 30 |
| <u>23</u> | R3 | 600 | 600 | 4.2 | <u>2</u> | 880 | 0.1 | 27 | <u>103</u> | 50 | 280 | 2 | 460 | 30 |
| <u>24</u> | R3 | 600 | 600 | 4.2 | <u>2</u> | 880 | 0.1 | 27 | <u>103</u> | 50 | 300 | 2 | 460 | 30 |
| <u>25</u> | R4 | 30 | <u>600</u> | 0.7 | <u>5</u> | 800 | 21.7 | 391 | 180 | 5 | 135 | 4 | 400 | 500 |
| <u>26</u> | R4 | 30 | <u>600</u> | 0.7 | <u>5</u> | 800 | 21.7 | 391 | 180 | 5 | 155 | 4 | 400 | 500 |
| <u>27</u> | R4 | 30 | <u>600</u> | 0.7 | <u>5</u> | 820 | 6.8 | 247 | 180 | 5 | 135 | 4 | 400 | 500 |
| <u>28</u> | R5 | 30 | <u>600</u> | 0.7 | <u>5</u> | 800 | 21.7 | 391 | 180 | 5 | 140 | 4 | 400 | 500 |

In table III, $T_{coil}$ is the coiling temperature, $T_{HBA}$ is the batch annealing temperature, $t_{HBAmin}$ is the minimal batch annealing time, $t_{HBA}$ is the batch annealing time, Vr is the heating rate to the annealing temperature $T_A$, $t_{Amin}$ is the minimal annealing time, $t_{Amax}$ is the maximal annealing time, $t_A$ is the annealing time, Vc is the cooling rate to the quenching temperature, QT is the quenching temperature, $t_Q$ is the holding time at the quenching temperature, $T_P$ the partitioning temperature, and $t_P$ the partitioning time. The underlined values are not according to the invention.

The microstructures are reported in Table IV. In Table IV, γ is the surface fraction of austenite, $\gamma_{Mn+}$ is the surface fraction of Mn-enriched austenite, $S\gamma_{Mn+}$ is the average size of the islands of Mn-enriched austenite, $\gamma_{Mn-}$ is the surface fraction of Mn-poor austenite, B is the surface fraction of bainite, FM is the surface fraction of fresh martensite, TM is the surface fraction of tempered martensite, and $d_C$ is the surface density of carbides in martensite whose largest dimension is higher than 60 nm.

TABLE IV

| Steel | γ (%) | $\gamma_{Mn+}$ (%) | $S\gamma_{Mn+}$ (nm) | $\gamma_{Mn-}$ (%) | B (%) | FM (%) | TM (%) | $d_C$ (×10$^6$/mm$^2$) |
|---|---|---|---|---|---|---|---|---|
| 1 | 12 | 3 | 200 | 9 | 0 | 2 | 86 | 0.1 |
| 2 | 13 | 3 | 230 | 10 | 0 | 3 | 84 | 0.2 |
| 3 | 13 | 4 | 250 | 9 | 0 | 4 | 83 | 0.5 |
| 4 | 14 | 4 | 250 | 10 | 0 | 5 | 81 | 0.4 |
| 5 | 12 | 3 | 450 | 9 | 0 | 4 | 84 | 0.8 |
| 6 | 12 | 4 | 200 | 8 | 0 | 5 | 83 | 0.8 |
| 7 | 15 | 5 | 300 | 11 | 0 | 5 | 79 | 0.5 |
| <u>8</u> | 15 | <u>0</u> | NA | 15 | 0 | 5 | 80 | 6 |
| <u>9</u> | 16 | <u>0</u> | NA | 16 | 0 | <u>10</u> | 74 | 5 |
| <u>10</u> | 18 | <u>0</u> | NA | 18 | 0 | <u>15</u> | 67 | 4 |
| 11 | 14 | 3 | 350 | 11 | 0 | 4 | 82 | 2 |
| 12 | 14 | 3 | 430 | 11 | 0 | 3 | 83 | 3 |
| 13 | 15 | 2 | 480 | 13 | 0 | 2 | 83 | 4 |
| 14 | 13 | 4 | 250 | 9 | 0 | 4 | 83 | 1 |
| 15 | 15 | 5 | 250 | 10 | 0 | 2 | 83 | 2 |
| <u>16</u> | 18 | <u>0</u> | NA | 18 | 0 | <u>15</u> | 67 | 5 |
| <u>17</u> | 20 | <u>0</u> | NA | 20 | 0 | <u>20</u> | 60 | 3 |
| <u>18</u> | 10 | <u>0</u> | NA | 10 | 0 | 5 | 85 | 4 |
| <u>19</u> | 10 | <u>0</u> | NA | 10 | 0 | 6 | 84 | 4 |
| <u>20</u> | 10 | <u>0</u> | NA | 10 | 0 | 6 | 84 | 4 |
| <u>21</u> | 10 | <u>0</u> | NA | 10 | <u>6</u> | 5 | 79 | 3 |
| <u>22</u> | 11 | <u>0</u> | NA | 11 | <u>10</u> | 8 | 71 | 2 |
| <u>23</u> | 11 | <u>0</u> | NA | 11 | <u>5</u> | 8 | 86 | 2 |
| <u>24</u> | 13 | <u>0</u> | NA | 13 | <u>10</u> | <u>12</u> | 65 | 1 |
| <u>25</u> | 19 | n.d. | n.d. | n.d. | n.d. | n.d. | n.d. | n.d. |
| <u>26</u> | 21 | n.d. | n.d. | n.d. | n.d. | n.d. | n.d. | n.d. |
| <u>27</u> | 21 | n.d. | n.d. | n.d. | n.d. | n.d. | n.d. | n.d. |
| <u>28</u> | 23 | n.d. | n.d. | n.d. | n.d. | n.d. | n.d. | n.d. |

In this Table, "NA" means "non applicable"; "n.d." means "non determined"; the underlined values are not according to the invention.

The mechanical properties are reported in Table V. Measured properties are the hole expansion ratio HER, the yield strength YS, the tensile stress TS, the uniform elongation UE and the total elongation TE.

TABLE V

|    | YS (MPa) | TS (MPa) | UE (%) | TE (%) | HER (%) | YS × UE (MPa %) | TS × TE (MPa %) | TS × HER (MPa %) |
|----|----------|----------|--------|--------|---------|-----------------|-----------------|------------------|
| 1  | 1262 | 1366 | 10.7 | 14.8 | 31   | 13541 | 20258 | 42346 |
| 2  | 1241 | 1365 | 11.3 | 15.0 | 33   | 14011 | 20530 | 45045 |
| 3  | 1295 | 1358 | 10.1 | 14.1 | 35   | 13131 | 19107 | 47530 |
| 4  | 1226 | 1350 | 11.1 | 15.3 | 29   | 13547 | 20696 | 39150 |
| 5  | 1228 | 1334 | 10.8 | 14.6 | 36   | 13312 | 19490 | 48024 |
| 6  | 1248 | 1356 | 10.7 | 14.6 | 32   | 13379 | 19811 | 43392 |
| 7  | 1275 | 1390 | 12.3 | 15.3 | n.d. | 15683 | 21267 | n.d.  |
| _8_  | _1102_ | 1302 | 10.5 | 14   | _26.3_ | _11571_ | _18228_ | 34243 |
| _9_  | _1014_ | 1308 | 11   | 14.2 | _25.5_ | _11154_ | _18574_ | 33354 |
| _10_ | _1012_ | 1317 | 11.3 | 14.5 | _23.7_ | _11436_ | 19097 | 31213 |
| 11 | 1254 | 1377 | 12.3 | 15.8 | 31   | 15362 | 21688 | 42687 |
| 12 | 1242 | 1394 | 12.3 | 15.2 | 28.5 | 15277 | 21175 | 39729 |
| 13 | 1237 | 1369 | 12.6 | 15.8 | 29   | 15537 | 21671 | 39701 |
| 14 | 1292 | 1398 | 11.2 | 15.3 | 32   | 14496 | 21431 | 44736 |
| 15 | 1241 | 1448 | 10.9 | 14.4 | 20.9 | 13527 | 20851 | 30263 |
| _16_ | _1088_ | 1344 | 11.5 | 14.9 | _19.4_ | _12512_ | 20026 | 26074 |
| _17_ | _956_  | 1373 | 12   | 14.8 | n.d. | _11472_ | 20320 | n.d. |
| _18_ | _1095_ | _1222_ | _9.5_ | 13   | n.d. | _10402_ | _15886_ | n.d. |
| _19_ | _1044_ | _1255_ | _9.1_ | _12.3_ | n.d. | _9500_  | _15436_ | n.d. |
| _20_ | _1062_ | _1253_ | _9.5_ | 12   | n.d. | _10089_ | _15036_ | n.d. |
| _21_ | _1047_ | _1172_ | _7.3_ | 12   | n.d. | _7643_  | _14064_ | n.d. |
| _22_ | _1016_ | _1168_ | _8.2_ | 13   | n.d. | _8331_  | _15184_ | n.d. |
| _23_ | _1051_ | _1191_ | _8_   | _12.6_ | n.d. | _8408_ | _15007_ | n.d. |
| _24_ | _987_  | _1173_ | _9.8_ | 13.5 | n.d. | _9672_  | _15835_ | n.d. |
| _25_ | 1109 | 1408 | 11 | 14 | _16_ | _12199_ | 19712 | 22528 |
| _26_ | 1136 | 1407 | 11 | 14 | _15_ | _12496_ | 19698 | 21105 |
| _27_ | 1218 | 1367 | 10.7 | 14.6 | _19_ | 13032.6 | 19958.2 | 25973 |
| _28_ | 1154 | 1428 | 11 | 15 | _9_  | _12694_ | 21420 | 12852 |

The yield strength YS, the tensile strength TS, the uniform elongation UE and the total elongation TE were measured according to the ISO standard ISO 6892-1, published in October 2009. The hole expansion ratio HER was measured according to the standard ISO 16630:2009.

Examples 1-7 and 11-15 were made from a steel having a composition according to the invention, and were produced by a manufacturing method according to the invention. All these examples have yield strength YS comprised between 1100 MPa and 1700 MPa, a tensile strength TS comprised between 1300 MPa and 2000 MPa, a uniform elongation UE of at least 10%, a total elongation TE measured according to ISO standard ISO 6892-1, of at least 13%, a product tensile strength×total elongation (TS×TE) higher than 19000 MPa %, a product yield strength×uniform elongation (YS×UE) higher than 13000 MPa % and a hole expansion ratio HER, measured according to the ISO standard 16630:2009, of at least 20%.

By contrast, Examples 8-10, 16 and 17 were maintained at the annealing temperature $T_A$ for a time $t_A$ higher than the maximal annealing time $t_{Amax}$. As a consequence, during the annealing, the carbides enriched in Mn during the batch annealing were completely dissolved, and Mn diffused in the whole structure, so that at the end of the annealing, no Mn-enriched austenite remained.

Thus, the final structure of these examples does not contain any Mn-enriched austenite, and the targeted properties are not achieved. Especially, none of these examples has a product yield strength×uniform elongation reaching 13000 MPa %.

Examples 18 to 20 are made of steel R1 comprising only 2.7% of Mn, i.e. less than 3.5% of Mn. As a result, even with a very long batch annealing time (10 h), leading to the formation of coarse carbides, insufficient enrichment of these carbides with Mn is obtained. Furthermore, Example 18 to 20 were maintained at the annealing temperature TA for a time $t_A$ higher than the maximal annealing time $t_{Amax}$.

As a consequence, at the end of the annealing, the steel sheet did not contain Mn-enriched austenite.

Thus, the final structures of Examples 18 to 20 do not contain any Mn-enriched austenite, and the targeted properties are not achieved.

Examples 21 and 22 are made of steel R2 comprising only 2.05% of Mn, and Examples 23 and 24 are made of steel R3, comprising only 2% of Mn. Furthermore, these Examples 21 to 24 were batch annealed for an insufficient time. As a result, an insufficient cementite fraction, and an insufficient enrichment of the cementite with Mn was obtained. Besides, Example 21 to 24 were maintained at the annealing temperature $T_A$ for a time $t_A$ higher than the maximal annealing time $t_{Amax}$. As a consequence, at the end of the annealing, the steel sheet did not contain Mn-enriched austenite. Besides, owing to the absence of stabilization of austenite by Mn, the austenite partly transformed into bainite during the partitioning.

Thus, the final structures of Examples 21 to 24 do not contain any Mn-enriched austenite and the targeted properties are not achieved.

Examples 26-28 were batch annealed at a temperature higher than Ac1-20° C. and consequently do not contain any Mn-enriched austenite. As a result, the targeted properties are not achieved.

The inventors have further determined the resistance spot weldability of sheets according to the invention as compared to sheets made of steel R4. Especially, sheets made of steels 11, 12 or R4 were resistance spot welded together and the alpha value, which is the maximum load in cross test divided by the weld diameter and the thickness was determined before any post weld heat treatment (No PWHT) and after a post weld heat treatment (with PWHT). It is a normalized load for resistant spot welding expressed in daN/mm².

The results are reported in Table VI below.

TABLE VI

| | Alpha value | |
|---|---|---|
| Assembly | No PWHT (daN/mm², i.e.*10 N/mm²) | With PWHT (daN/mm² i.e.*10 N/mm²) |
| I1+I1 | 32 | 74 |
| I2+I2 | 33 | 73 |
| R4+R4 | 23 | 38 |

Table VI shows that with the steels of the invention high ductility and strength can be obtained whilst retaining a good weldability. To the contrary, steel R4 reaches a high tensile strength to the detriment of the spot weldability.

Thus, the steel of the invention can be advantageously used to produce various welded structures.

In particular, a welded structure, including resistance spot weld joints, of at least two steel sheets, can be produced by producing a first steel sheet by a method according to the invention, providing a second steel sheet, and resistance spot welding the first steel sheet to the second steel sheet. The second steel sheet is for example produced by a method according to the invention.

Thus, a resistance spot weld joint having a high alpha value is obtained. Especially, the alpha value before any post weld heat treatment is of at least 30 daN/mm², i.e. of at least 30*10 N/mm², and the alpha value after post weld heat treatment is of at least 50 daN/mm², i.e. of at least 50*10 N/mm².

The steel sheets optionally welded by resistance spot welding according to the invention are used with profit for the manufacture of structural parts in motor vehicles since they offer high formability during the fabrication process and high energy absorption in case of collision. The resistance spot welds according to the invention are also used with profit for the manufacture of structural parts in motor vehicles.

What is claimed is:

1. A cold-rolled and heat-treated steel sheet, having a composition comprising, by weight percent:
  *0.10%≤C≤0.40%;
  *3.5%≤Mn≤8.0%;
  *0.5%≤Si≤2.5%;
  *0.003%≤Al≤3.0%;
  with Si+Al≥0.8%;
  *0.001%≤Mo≤0.5%;
  S≤0.010%;
  P≤0.020%;
  N≤0.008%;
  such that $C_{eq}$=C %+Mn %/6+Si %/6+(Cr %+Mo %+V %)/5≤1.30%;
  optionally one or more elements selected from amongst Cr, Ti, Nb, V and B, such that:
  *0.01%≤Cr≤2.0%;
  *0.010%≤Ti≤0.080%;
  *0.010%≤Nb≤0.080%;
  *0.010%≤V≤0.30%; and
  0.0005% B≤0.003%, and a remainder comprising iron and unavoidable impurities resulting from smelting, the cold-rolled steel sheet having a microstructure consisting of, in surface fraction:
  between 10% and 50% of retained austenite;
  at most 8% of fresh martensite; and
  tempered martensite,
  the retained austenite comprising:
  Mn-enriched austenite, having a Mn content higher than 1.3*Mn %, Mn % designating the Mn content in the composition; and
  Mn-poor austenite, having an Mn content comprised between 0.5*Mn % and 1.3*Mn %,
  a surface fraction of said Mn-enriched austenite with respect to the whole microstructure being between 2% and 12%.

2. The cold-rolled and heat-treated steel sheet according to claim 1, wherein the Mn-poor austenite and Mn-enriched austenite have an average C content between 0.4% and 1.0%.

3. The cold-rolled and heat-treated steel sheet according to claim 1, wherein the Mn-enriched austenite is in a shape of islands, an average size of the islands of Mn-enriched austenite being lower than 500 nm.

4. The cold-rolled and heat-treated steel sheet according to claim 1, wherein the fresh and tempered martensite comprise carbides, a surface density of carbides with a largest dimension being higher than 60 nm being less than or equal to $4 \times 10^6$/mm².

5. The cold-rolled and heat-treated steel sheet according to claim 1, wherein the cold-rolled and heat-treated steel sheet has a yield strength YS between 1100 MPa and 1700 MPa, a tensile strength TS between 1300 MPa and 2000 MPa, a uniform elongation UE of at least 10%, a total elongation TE, measured according to ISO standard ISO 6892-1, of at least 13%, a product tensile strength×total elongation (TS×TE) of at least 19000 MPa %, a product yield strength×uniform elongation (YS×UE) of at least 13000 MPa % and a hole expansion ratio HER, measured according to the ISO standard 16630:2009, of at least 20%.

6. The cold-rolled and heat-treated steel sheet according to claim 1, wherein the cold-rolled and heat-treated steel sheet is coated with Zn or a Zn alloy.

7. The cold-rolled and heat-treated steel sheet according to claim 1, wherein the cold-rolled and heat-treated steel sheet is coated with Al or a Al alloy.

8. The cold-rolled and heat-treated steel sheet according to claim 1, wherein the composition satisfies at least one of the following conditions:
  *0.40%≥C≥0.15%, and
  0.10%≤C≤0.30%.

9. The cold-rolled and heat-treated steel sheet according to claim 1, wherein 8.0%≥Mn≥3.7%.

10. A method for manufacturing a cold-rolled and heat-treated steel sheet of claim 1, comprising successively the steps of:
  casting a steel to obtain a slab, the steel having a composition comprising, by weight percent:
  *0.10%≤C≤0.40%;
  *3.5%≤Mn≤8.0%;
  *0.5%≤Si≤2.5%;
  *0.003%≤Al≤3.0%;
  with Si+Al≥0.8%;
  *0.001%≤Mo≤0.5%;
  S≤0.010%;
  P≤0.020%;
  N≤0.008%;

such that $C_{eq}$=C %+Mn %/6+Si %/6+(Cr %+Mo %+V %)/5≤1.30%;
optionally one or more elements selected from the group comprising Cr, Ti, Nb, V and B, such that:
* 0.01%≤Cr≤2.0%;
* 0.010%≤Ti≤0.080%;
* 0.010%≤Nb≤0.080%;
* 0.010%≤V≤0.30%; and
0.0005% B≤0.003%,
and a remainder comprising iron and unavoidable impurities resulting from smelting;
reheating the slab at a temperature $T_{reheat}$ between 1150° C. and 1300° C.;
hot rolling the reheated slab at a temperature higher than Ar3 to obtain a hot rolled steel;
coiling the hot-rolled steel at a temperature between 20° C. and 600° C.;
annealing the hot-rolled steel at a temperature $T_{HBA}$ greater than or equal to 500° C. and lower than Ac1-20° C., for a time $t_{HBA}$ greater than or equal to a minimal batch annealing time $t_{HBAmin}$, defined as:

$$t_{HBAmin}=\exp[8.32/T_{HBA}\times1000-12]\times(1000*C\%/Mn\%^2)$$

wherein $t_{HBAmin}$ is expressed in ours, $T_{HBA}$ is the batch annealing temperature, expressed in Kelvin, Mn % designates the Mn content of the steel, by weight percent, and C % designates the C content of the steel, by weight percent;
cold rolling the hot-rolled steel to obtain a cold rolled steel sheet;
reheating the cold-rolled steel sheet to an annealing temperature $T_A$ between Ae3 and Ae3+150° C. to obtain, upon annealing, a structure consisting of austenite and maintaining the cold-rolled steel sheet at the annealing temperature $T_A$ for a holding time $t_A$ between $t_{Amin}$ and $t_{Amax}$, $t_{Amin}$ and $t_{Amax}$ being defined as:

$$t_{Amin}=\exp[68.4/T_A\times1000-69.07]\times3600\times(Mn\%/20\times C\%+Cr\%)$$

$$t_{Amax}=\exp[27.03/T_A\times1000-27.63]\times3600\times(Mn\%/20\times C\%+Cr\%)$$

wherein $t_{Amin}$ and $t_{Amax}$ are expressed in seconds and the annealing temperature $T_A$ is expressed in Kelvin, Mn % designates the Mn content of the composition, expressed by weight percent, C % designates the C content of the composition, expressed by weight percent and Cr % designates the Cr content of the composition, expressed by weight percent;
quenching the cold-rolled steel sheet at a cooling rate high enough to avoid a formation of ferrite and pearlite upon cooling, to a quenching temperature QT between Mf+20° C. and Ms−50° C.;
reheating the cold-rolled steel sheet to a partitioning temperature $T_P$ between 350° C. and 500° C., and maintaining the cold-rolled steel sheet at the partitioning temperature $T_P$ for a partitioning time $t_P$ comprised between 3 s and 1000 s; and
cooling the cold-rolled steel sheet to room temperature, to obtain a cold-rolled and heat-treated steel sheet.

11. The method according to claim 10, wherein, after the cold-rolled steel sheet is quenched to the quenching temperature QT and before the cold-rolled steel sheet is heated to the partitioning temperature $T_P$, the cold-rolled steel sheet is held at the quenching temperature QT for a holding time between 2 s and 200 s.

12. The method according to claim 10, wherein, between the maintaining of the cold-rolled steel sheet at the partitioning temperature $T_P$ and the cooling of the cold-rolled steel sheet to the room temperature, the cold-rolled steel sheet is hot-dip coated in a bath at a temperature lower than or equal to 480° C.

13. The method according to claim 10, wherein, after the maintaining of the cold-rolled sheet at the partitioning temperature $T_P$, the cold-rolled steel sheet is immediately cooled to the room temperature.

14. The method according to claim 13, wherein after the step of cooling down the cold-rolled steel sheet to the room temperature, the cold-rolled and heat-treated steel sheet is coated by an electrochemical method or through a vacuum coating process.

15. The method according to claim 12, wherein the cold-rolled and heat treated steel sheet is coated with Zn or a Zn alloy.

16. The method according to claim 12, wherein the cold-rolled and heat-treated steel sheet is coated with Al or a Al alloy.

17. The method according to claim 10, wherein the composition satisfies at least one of the following conditions:
* 0.40%≥C≥0.15%, and
0.10%≤C≤0.30%.

18. The method according to claim 10, wherein 8.0%≥Mn≥3.7%.

19. The method according to claim 10 wherein, after the cold-rolled steel sheet is quenched to the quenching temperature QT and before the cold-rolled steel sheet is heated to the partitioning temperature $T_P$, the cold-rolled steel sheet is held at the quenching temperature QT for a holding time between 3 s and 7 s.

* * * * *